United States Patent [19]

White

[11] Patent Number: 5,311,445
[45] Date of Patent: May 10, 1994

[54] DECONVOLUTED BAND REPRESENTATION FOR INFRARED SPECTRUM COMPRESSION

[75] Inventor: Robert L. White, Norman, Okla.

[73] Assignee: Board of Regents of the University of Oklahoma, Norman, Okla.

[21] Appl. No.: 124,522

[22] Filed: Sep. 20, 1993

Related U.S. Application Data

[63] Continuation of Ser. No. 42,853, Apr. 5, 1993, abandoned, which is a continuation of Ser. No. 954,601, Sep. 30, 1992, abandoned, which is a continuation of Ser. No. 702,438, May 16, 1991, abandoned, which is a continuation of Ser. No. 340,387, Apr. 19, 1989, abandoned.

[51] Int. Cl.⁵ .................. G06F 15/31; G06F 15/42
[52] U.S. Cl. .................................................. 364/498
[58] Field of Search ............. 364/497, 498, 487; 381/29, 30, 31, 50

[56] References Cited

U.S. PATENT DOCUMENTS

| | | | |
|---|---|---|---|
| 2,938,079 | 5/1960 | Flanagan | 381/50 X |
| 2,990,453 | 6/1961 | Flanagan | 381/50 |
| 3,504,164 | 3/1970 | Farrell et al. | 364/487 |
| 4,072,851 | 2/1978 | Rose | 364/487 |
| 4,314,343 | 2/1982 | Tomlinson | 364/498 |
| 4,546,643 | 10/1985 | Bonneyrat et al. | 364/498 |
| 4,642,778 | 2/1987 | Hieftje | 364/497 X |
| 4,703,437 | 10/1987 | Nishimura | 364/498 |
| 4,807,148 | 2/1989 | Lacey | 364/498 |
| 4,987,548 | 1/1991 | Saito et al. | 364/498 |

Primary Examiner—Thomas G. Black
Assistant Examiner—Michael Zanelli
Attorney, Agent, or Firm—Dunlap, Codding & Lee

[57] ABSTRACT

Disclosed is a method for infrared spectrum compression wherein a plurality of referenced spectrums each corresponding to one of a plurality of known substances is digitized to obtain a plurality of reference digitized spectrums. The intensity, location and width of each peak for each reference digitized spectrum then is identified and this information is stored. The stored information relating to each of the referenced digitized spectrums is used to compare with an unknown digitized spectrum of an unknown substance to identify the unknown substance.

3 Claims, 4 Drawing Sheets

DECONVOLUTED BAND REPRESENTATION FOR INFRARED SPECTRUM COMPRESSION

This is a continuation of co-pending application Ser. No. 08/042,853 filed on Apr. 5, 1993, entitled "DECONVOLUTED BAND REPRESENTATION FOR INFRARED SPECTRUM COMPRESSION", now abandoned, which was a continuation of co-pending application Ser. No. 07/954,601 filed on Sep. 30, 1992, entitled "DECONVOLUTED BAND REPRESENTATION FOR INFRARED SPECTRUM COMPRESSION", now abandoned, which was a continuation of U.S. Ser. No. 07/702,438 filed on May 16, 1991, entitled "DECONVOLUTED BAND REPRESENTATION FOR INFRARED SPECTRUM COMPRESSION", now abandoned, which was a continuation of U.S. Ser. No. 07/340,387, filed on Apr. 19, 1989, entitled, "DECONVOLUTED BAND REPRESENTATION FOR INFRARED SPECTRUM COMPRESSION", now abandoned.

FIELD OF THE INVENTION

The present invention relates to a spectrum compression algorithm for reducing computer media storage space.

BRIEF DESCRIPTION OF THE DRAWINGS

FIG. 3b shows component bands obtained by curve-fitting with respect to the spectrum of cocaine shown in FIG. 3a.

Figure 1:
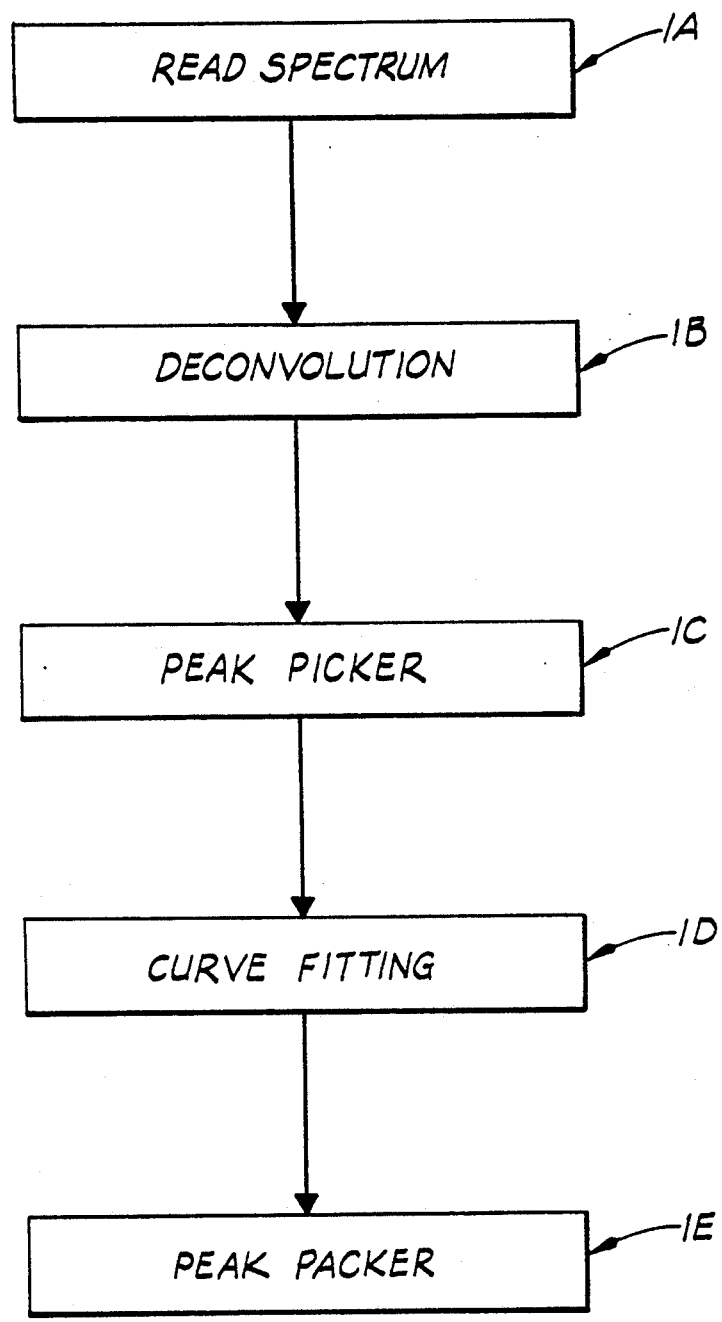
FIG. 1 is a deconvoluted band compression flow chart.
Figure 2A:
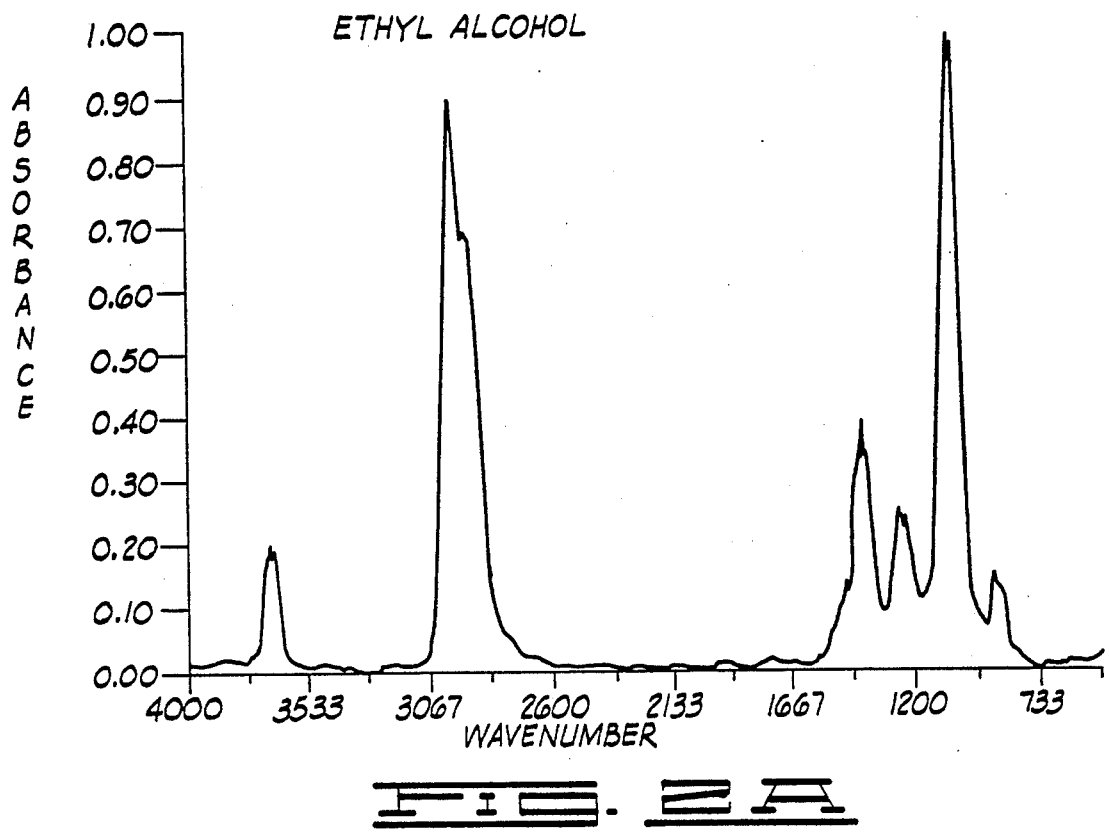
FIG. 2a is a Fourier self-convoluted vapor-phase spectrum of ethanol.
Figure 2B:
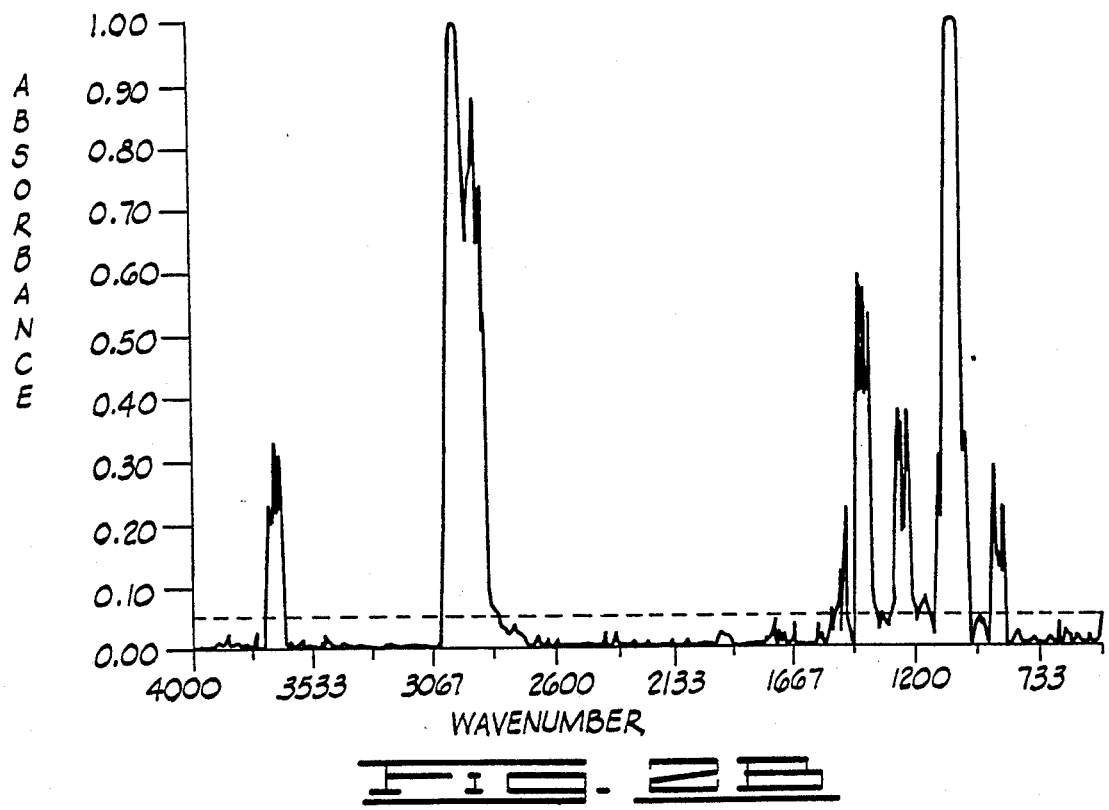
FIG. 2b is the curve of FIG. 2a after applying deconvolution to the spectrum.
Figure 2C:
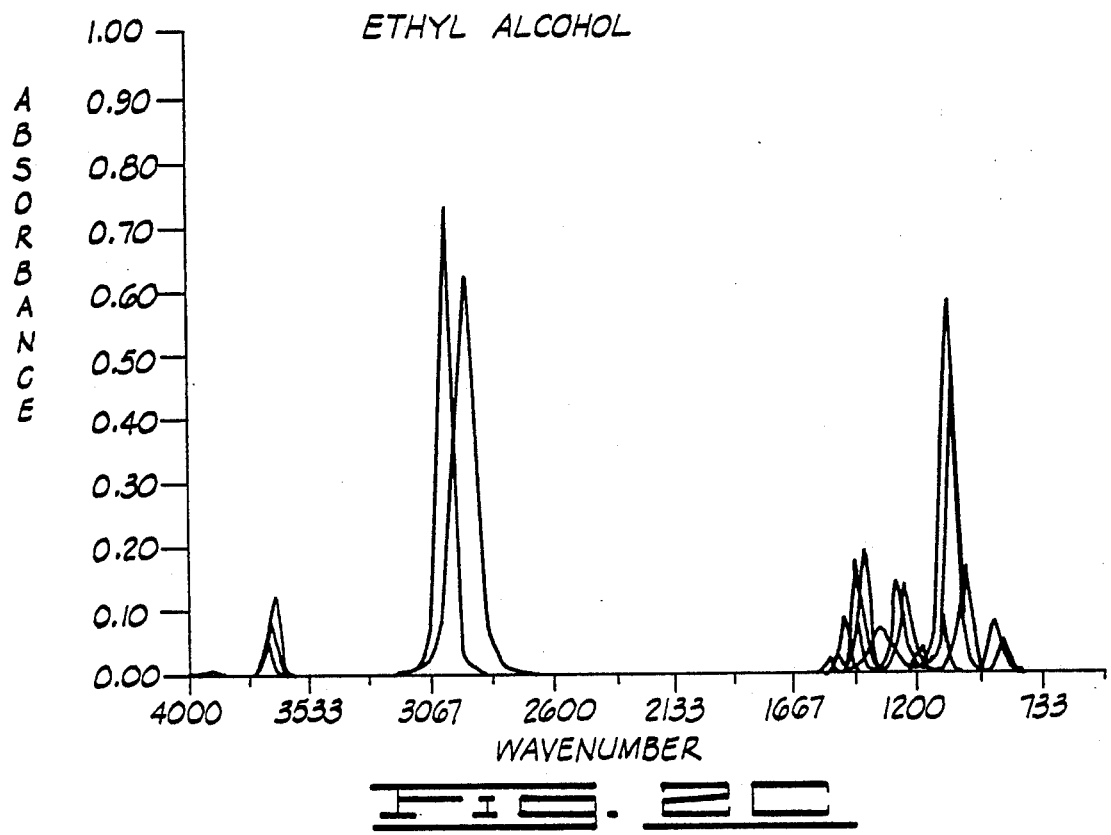
FIG. 2c is a reconstructed ethyl alcohol spectrum with component bands obtained by curve-fitting.
Figure 2D:
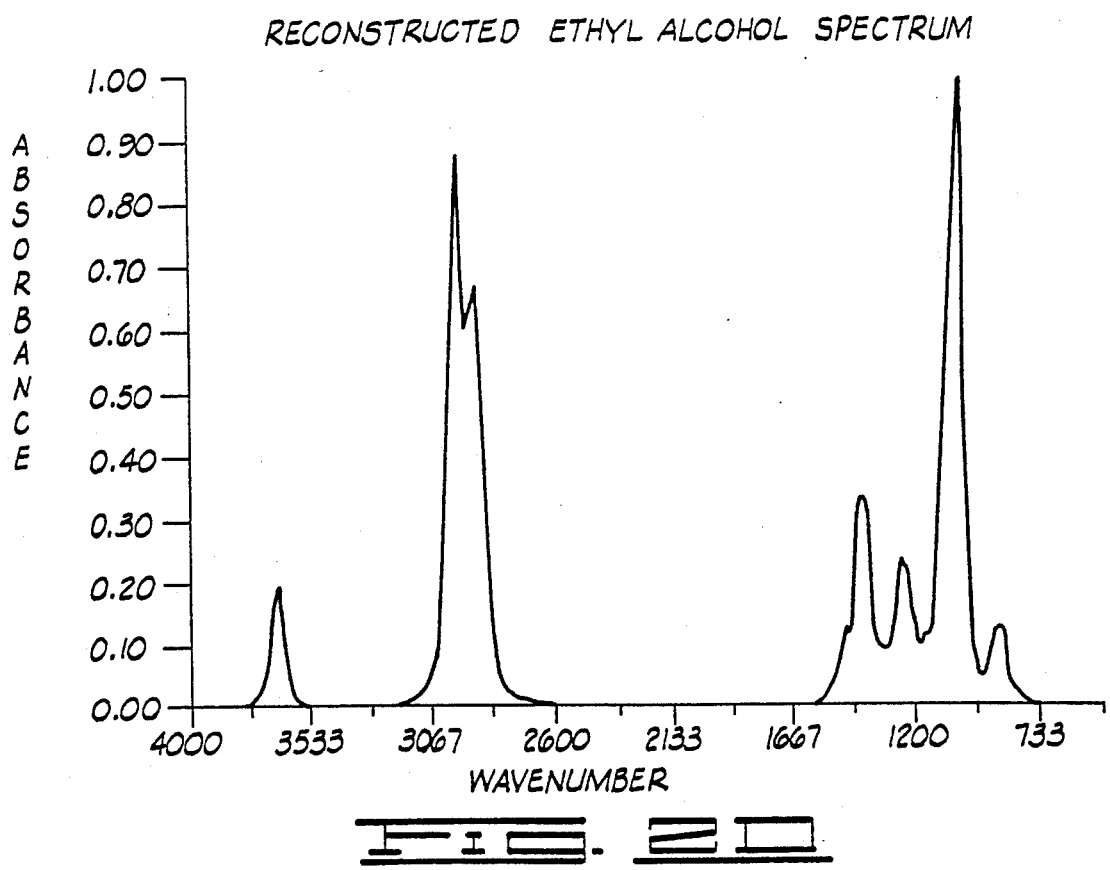
FIG. 2d is a reconstructed ethanol spectrum.

NOTE: Numerals appearing in parenthesis refer to literature citations listed at the end of the specification.

DESCRIPTION OF THE PREFERRED EMBODIMENTS

Infrared spectroscopy is an important tool for molecular structure elucidation. Development of sensitive and rapid infrared analysis methods that generate numerous spectra such as gas chromatograph-Fourier transform infrared spectroscopy (GC/FT-IR) has created a need for improved spectral interpretation methods. Emphasis in recent years has been placed on developing computerized spectrum interpretation methods employed today in library searching (1). In this method, a reference set of high-quality spectra are compared to spectra of materials to be identified. Reference spectra are sorted in order of decreasing similarity, and a list of the best matching spectra is provided to the operator. The list may container the identity of the unknown material. More often, trends in top matches identify molecular functionalities likely to be present in the molecular.

The first infrared spectral libraries were simply collections of spectral plots contained in book form. These libraries were suitable for manual searching but were incompatible with automated methods. Kuentzel described the first machine-oriented library searching procedure in 1951 in which Hollerith punch cards were used (2). As computer facilities became more accessible and powerful, more advanced spectral compression methods were developed. The goal of spectral compression is to reduce the storage space required for reference spectra while retaining structure-specific information. Early compression methods reduced spectra to binary format. Spectra were manually encoded from spectral plots and stored on punch cards that could be read into a computer. Band center assignments were subject to instrument calibration errors and inconsistencies in manual selection of spectral band positions. Improved infrared spectral digitization was attained by using devices for translating hard-copy plots into digital format (3,4). Binary information can be augmented with band intensity (5,6) as well as width designations (7,8). Augmented binary representations contain qualitative band intensity information encoded by using numbers to indicate relative magnitude (e.g. 1=strong, 2=medium, 3=weak). Bandwidth can be represented in a similar manner (e.g. 1=sharp, 2=medium, 3=broad). The trend since the mid-1970's has been to develop searching methods based on digitized spectra (9–11). A digitized infrared spectrum consists of a sequence of intensity values sampled at equal wavelength intervals and normalized by either scaling the highest intensity to unit absorbance or dividing each intensity by the square root of the sum of the squares of all intensities (12). Digitized spectra can be used to accurately represent complex spectral curves. This form of reference spectrum storage is particularly useful because FT-IR spectrometers generate spectra in this format. Library search spectral comparisons are made by computing point-by-point differences between unknown and reference spectra. This method of spectrum correlation can yield acceptable matches even when multiple band overlap occurs. A disadvantage of this form of library searching is that a large amount of information must be stored in order to preserver adequate spectral detail. Often, 8 bits are used to represent digitized spectrum intensities. At 4-cm$^{-1}$ resolution (2 cm$^{-1}$ between digitized intensities), 14000 bits are required to represent an infrared spectrum from 4000 to 500 cm$^{-1}$. Most FT-IR spectra are measured at 4-cm$^{-1}$ resolution or better. However, library reference spectra are often stored at reduced resolution (16 or 32 cm$^{-1}$) in order to minimize the amount of computer storage media needed. Ideally, one would like to achieve spectral compression without sacrificing spectral resolution. A spectrum compression algorithm that combines features of augmented binary and digitized spectrum storage formats is described here. The algorithm provides significant storage space reduction with minimal loss of structural information.

A Mattson Instruments, Inc., Starlab data system was used for all phases of software development and testing. Fourier self-deconvolution was achieved by using the DECON command, which is part of the Mattson Instrument, Inc., infrared analysis software package. Three parameters were required to specify the degree of deconvolution obtained by use of the DECON command. These parameters were empirically optimized by studying the effects of the DECON command on several EPA vapor-phase infrared library spectra. Pseudo-interferogram length was set to 0.4 cm, the exponent scaling factor was 60, and the apodization function was $\cos^8$ for all library spectrum deconvolutions. The DECON process was successively applied to spectra eight times to obtain over-deconvoluted spectra. Digitized spectrum search software utilizing the EPA vapor-phase library and programs needed for spectral compression were written in C programming language. Euclidean distance was used as the metric for all library search comparisons. A fractional integer format was implimented to speed up mathematical computations needed for curve-fitting and spectrum reconstruction. In fractional integer format, numbers were represented by 32 bits with an implied decimal point at bit 20. In this way, floating point numbers could be manipulated without using double precision floating point multiplications and divisions. Fractional integer representations were accurate to six digits past the decimal point. Assembly language (68000) subroutines were written to perform fractional integer math. Fractional integer multiplications required 83 us and divisions required 120 us, compared to 320 and 700 us, respectively, for double precision operations. A reference library of 3210 vapor-phase spectra obtained by GC/FT-IR was used to evaluate the deconvoluted band compression format. These spectra were obtained from the EPA vapor-phase library after eliminating spectra with sloping base lines.

The infrared spectrum compression algorithm consists of the five steps shown in FIG. 1 and has been fully automated. The input spectrum must be in digitized format, but no resolution requirement is imposed as indicated by the "Read Spectrum" in FIG. 1 designated by the reference numeral 1A. Fourier self-deconvolution (13) permits separation of overlapping bands contributing to complex spectra as indicated by "Deconvolution" in FIG. 1 designated by the reference numeral 1B. The peak picker 1C locates these bands on the wavelength axis. Curve-fitting is employed to adjust individual band parameters to best match the original spectrum as indicated in FIG. 1 by "Curve-fitting" designated by the reference numeral 1D. Finally, three parameters that completely define deconvoluted spectral bands are packed into 32 bits for storage as indicated in FIG. 1 by "Peak Packer" designated by the reference numeral 1F.

The individual steps used to create a deconvoluted band representation are illustrated in FIG. 2 for ethyl alcohol. FIG. 2a is a digitized FT-IR spectrum of ethyl alcohol measured at 4 -cm$^{-1}$ resolution. FIG. 2b shows the result of applying Fourier self-deconvolution 1B to the ethyl alcohol spectrum. The deconvolution process 1B severely distorts the original spectrum by artificially narrowing absorbance bands. The purpose of this step is to separate overlapping absorbance bands so that they will be identified by the peak picker 1C. The peak picker 1C used a threshold (dashed line in FIG. 2b) to discriminate between base-line noise and actual absorbance bands. The peak picker 1C threshold permitting the best discrimination between absorbance bands and base-line noise was empirically determined to be 0.05 absorbance unit. This threshold was employed for all spectrum compressions. The peak picker 1C determined band center locations for all bands in the spectrum and stored this information in a computer readable file. The next step in the procedure was curve-fitting 1D. The curve-fitter 1D used the band center locations provided by the peak picker 1C and a user-specified band profile function to reconstruct the original spectrum. The band profile used for this study was a 1:1 combination of Lorentzian and Gaussian shapes. The curve-fitting algorithm employed an iterative loop in which bandwidths and intensities were varied until the sum of all bands closely matched the original digitized spectrum (14, 15). Absorbance band centers obtained from the peak picker 1C were not permitted to vary during curve-fitting 1D. Curve-fitting was achieved by minimizing the sum of the squares of differences between reconstructed and original spectral intensities. FIG. 2c shows the result of curve-fitting 1D for ethyl alcohol. The 24 individual bands were summed to obtain the spectrum shown in FIG. 2d. This spectrum is a close approximation of the original spectrum in FIG. 2a.

The reconstructed spectrum (FIG. 2d) was stored as a set of component bands. Each band was represented by three parameters. Band intensity was stored as an 8-bit integer with an accuracy of 0.004 absorbance unit (input spectra were scaled so that the largest absorbance band was unit absorbance). Band location and width were each stored in 12 bits, yielding 1 -cm$^{-1}$ accuracy. Thus, 32 bits were required to represent each band. The total storage space needed for each spectrum depended on the number of bands it contained. For typical vapor-phase infrared spectra, 10-30 deconvoluted bands could usually be isolated.

Many curve-fitting iterations were often required to match reconstructed spectra to the original data with high accuracy. With the Starlab data system, approximately six spectra could be compressed per hour. Three weeks of computer time were required to compress the EPA vapor-phase library, which contained 3300 spectra. This time could have been reduced by using a computer system with a math coprocessor to speed up floating point multiplications and divisions needed for curve-fitting. Fortunately, spectral compression need only be performed once. After the compressed library was formed, spectrum reconstruction could be accomplished rapidly. Bands summed to reconstruct spectra were represented by digitizing band profile intensities at wavelength intervals determined by the spectral resolution desired. Intensities were computed for wavelengths within $2\sigma$ (where $\sigma$ was the standard deviation of the band profile) of the band center ($4\sigma$ base-line width). Intensities outside this range were set to zero. The subroutine that reconstructed spectra performed three floating point divisions per band to unpack band parameter information and two floating point multiplications per digitized intensity. Assuming that floating point operations constitute the largest contribution to spectrum regeneration, the time required to reconstruct a spectral band can be estimated by $$t \ (us) = 3t_{div} + (16\sigma/res)t_{mult}$$

where $t_{div}$ and $t_{mult}$ are the times (in microseconds) required for floating point division and multiplication, respectively, and "res" denotes the spectral resolution (in reciprocal centimeters) of the reconstructed spectrum. For example, a 20 -cm$^{-1}$ (full width at half-height) band in a 16-cm$^{-1}$ spectrum would require approximately 1.2 ms for calculation by the Starlab data system by using fractional integer multiplications and divisions. A spectrum containing 20 such bands would require approximately 24 ms for reconstruction.

The procedure depicted in FIG. 1 was applied to 3210 4-cm$^{-1}$ infrared vapor-phase spectra obtained from EPA vapor-phase library after eliminating spectra with substantial base-line drift. On average, vapor-phase spectra could be represented between 4000 and 500 cm$^{-1}$ by the sum of 21.5 bands requiring 688 bits per spectrum for storage. This is less than the storage required for 64-cm$^{-1}$ digitized spectra and a factor of 20 less than storage required for 4-cm$^{-1}$ spectra. The average difference between reconstructed (4-cm$^{-1}$) and original vapor-phase spectra was approximately 0.02 absorbance units per digitized point (2%).

An evaluation of reconstructed spectra was made by searching each of the 3210 library spectra against a data base comprising reconstructed spectra. Search lists contained the correct identity of the material in the top five matches for 99.3% of all spectra searched. The correct structure was identified as the top match in 96.5% of all searches. The process was then reversed, and reconstructed spectra were searched against the digitized data base. The results of this evaluation were similar to that of the previous test. The correct identity of the material was identified in the top five matches 99.7% of the time, and 96.6% of the top matches were correct. This indicates that reconstructed spectra retain nearly all structural information contained in original spectra. Another test of the deconvoluted band format was performed by comparing search results obtained by using the EPA and deconvoluted band libraries for 32 7-cm$^{-1}$ resolution infrared vapor-phase spectra obtained by GC/FT-IR analysis of a flavor mixture. On average, three of the top five matches were common to both search result lists. In all cases, top matches from both searches were identical or indicated species with similar structures.

Figure 3A:
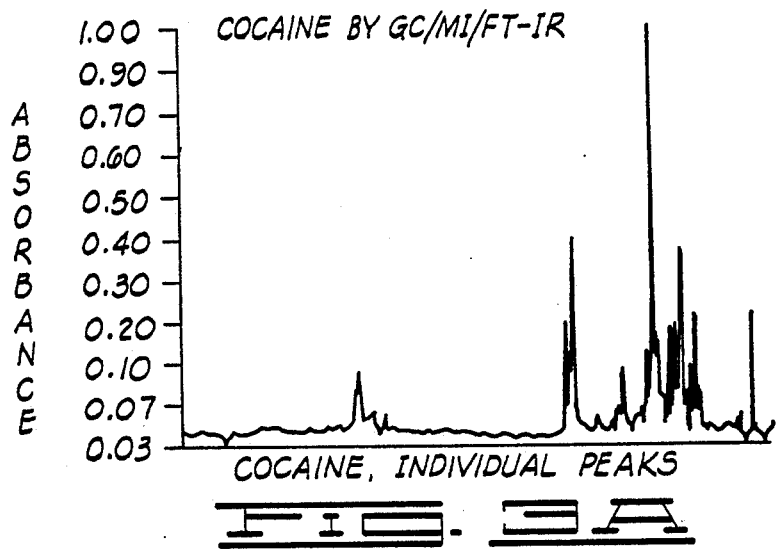
FIG. 3a is a spectrum of cocaine.
Figure 3B:
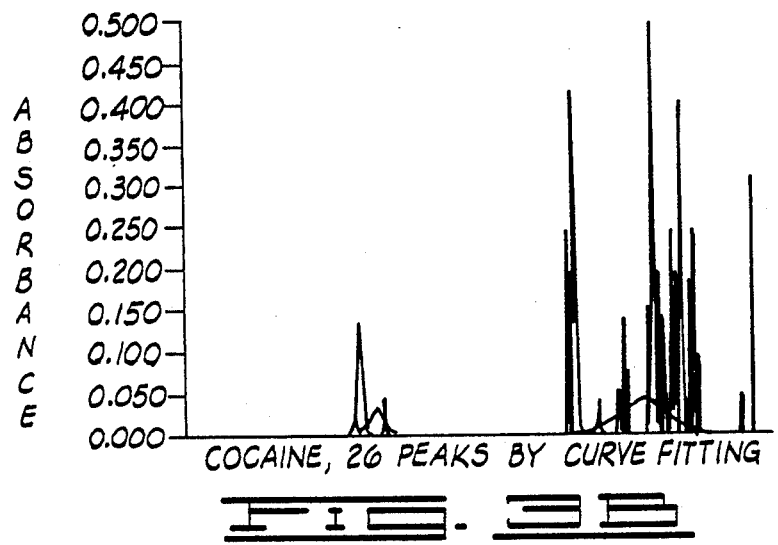
Figure 3C:
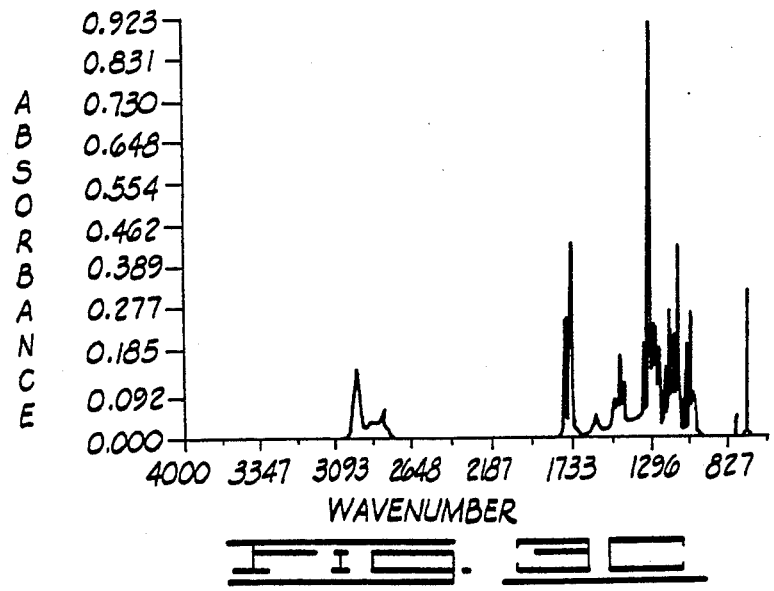
FIG. 3c is a reconstructed cocaine spectrum.

The spectrum reconstruction method described here is applicable to all conventional forms of infrared analysis (vapor, liquid, pellet, mull, etc.). In addition, the method is well suited to spectra obtained by a relatively new GC/FT-IR analysis method known as matrix isolation (GC/MI/FT-IR). Matrix isolation analysis is achieved by freezing molecules in an argon matrix and then measuring infrared spectra. Rotational band broadening observed in vapor-phase infrared spectra is eliminated by freezing the molecules. Matrix isolation infrared spectra are rich in structural information and are characterized by extremely sharp bands. This information can be preserved only if spectra are stored at relatively high resolution (i.e. 1-2 cm$^{-1}$). FIG. 3 shows the result of applying the deconvoluted band compression algorithm to a matrix isolation spectrum of cocaine. FIG. 3a is a cocaine spectrum obtained by GC/MI/FT-IR. FIG. 3b shows the 26 component bands obtained by curve-fitting. FIG. 3c is the reconstructed matrix isolation spectrum obtained by summing the bands shown in FIG. 3b. The important features in FIG. 3a are retained in the reconstructed spectrum (FIG. 3c). Assuming that a spectral resolution of 1-2 cm$^{-1}$ is required to accurately represent GC/MI/FT-IR spectra, the deconvoluted band compression method can provide a factor of 40-80 reduction in storage space needed to archive spectra, corresponding to 97.5%-99% data compression.

The deconvoluted band compression algorithm described here reduces storage requirements for infrared spectral libraries with minimal loss of structural information. Manipulations can be performed on reconstructed digitized spectra, or band location, intensity, and width information can be used without spectrum reconstruction. Boolean operations can be employed to reduce the size of the digitized library searched by comparing band locations for unknown and library spectra.

Spectral searches performed by using the deconvoluted band compressed EPA library on the Starlab data system were about 3 times slower than searches of the digitized library. Because searches required spectrum reconstruction, search times were dependent on the rate at which floating point multiplications and divisions were performed. Table I contains a comparison of spectrum read (digitized spectrum search method) and reconstruction times for a 16-cm$^{-1}$ butyric acid vapor-phase infrared spectrum measured for two different data systems. Disk read times were comparable for both systems. However, the 80386 computer with a math coprocessor was about 2.5 times faster for spectrum reconstruction than the Starlab system despite the fact that double precision (64 bit) floating point operations were performed instead of fractional integer math. Spectrum reconstruction for the 80386 system was only slightly slower than digitized spectrum disk read. This illustrates the dependence of deconvoluted band library search times on computer system hardware.

The deconvoluted band spectrum compression format described here may be used for reverse-search, pattern recognition, and artificial intelligence applications. Most reverse-search (mixture analysis) algorithms operate with band location information only. Reverse search is added to conventional digitized spectrum search systems by including a "peak table" in addition to the digitized spectrum library. An additional peak table is not required when information is represented in the deconvoluted band format. The goal of pattern recognition is to develop algorithms that are capable of recognizing the presence of structural features solely on the basis of spectral information (16, 17). Deconvoluted band spectral representations provided more accurate representations of infrared spectra than binary representations most often used for pattern recognition studies. It may be possible to improve discriminant functions by employing deconvoluted band information with pattern recognition techniques. Artificial intelligence has been applied to infrared spectral interpretation in the form of various expert systems. An expert system attempts to mimic the actions of an experienced spectroscopist in making correlations between spectra and structure (18). As with pattern recognition, more accurate spectral band information provided by the deconvoluted band compression format may lead to more effective interpretation rules. In addition, high-quality reference spectra can be reconstructed from a deconvoluted band library and used for visual comparisons and spectral subtractions. This luxury was previously restricted to libraries composed of digitized spectra. Spectral subtraction can be used in spectral stripping, a method for mixture analysis (19). We are currently investigating the use of the band storage format for these applications.

LITERATURE CITED (1) Coats, J. Spectroscopy 1988 3, 14.
(2) Kuentzel, L. E. Anal. Chem. 1951, 23, 1413.
(3) de Haseth, J. A.; Woodward, W. S.; Isenhour, T. L. Anal. Chem. 1976, 48, 1513.
(4) Clerc, J. T.; Knutti, R.; Koenitzer, H.; Zupan, J. Fresenlus' Z. Anal. Chem. 1977, 283,177.
(5) Penski, E. C.; Padowski, D. A.; Bouck, J. B. Anal. Chem. 1974, 46, 955.
(6) Fox, R. C. Anal. Chem. 1976, 48, 717.
(7) Warren, F. V., Jr.; Delaney, M. F. Appl. Spectrosc. 1983, 37, 172.
(8) Delaney, M. F.; Hallowell, J. R.,; Warren, F. V., Jr. J. Chem. Inf. Comput. Sci. 1985, 25, 27.
(9) Tanabe, K.; Saeki, S. Anal. Chem. 1975, 47,118.

(10) Powell, L. M.; Hieftje, G. M. Anal. Chim. Acta 1978, 100, 313.
(11) Rasmussen, G. T.; Isenhour, T. L. Appl. Sepctrosc. 1979, 33, 371.
(12) Harrington, P. B.; Isenhour, T. L. Appl. Spectrosc. 1987, 41, 1298.
(13) Kauppinen, J. K.; Moffatt, D. J.; Mantsch, H. H.; Cameron, D. G. Appl. Spectrosc. 1981, 35, 271.
(14) Marquardt, D. W.; Bennett, R. G.; Burrell, E. J. J. Mol. Spectrosc. 1961, 7, 269.
(15) Steigstra, H.; Jansen, A. P. Anal. chem. Acta 1987, 193, 269.
(16) Woodruff, H. B.; Lowery, S. R.; Ritter, G. L.; Isenhour, T. L. Anal. Chem. 1975, 47, 2027.
(17) Lowery, S. R.; Isenhour, T. L. J. Chem. Inf. Comput. Sci. 1975, 15, 212.
(18) Dessy, R. E. Anal. Chem. 1984, 56, 1200A.
(19) Johnson, D. J.; Compton, D. A. C. Spectroscopy 1988, 3, 47.

Changes may be made in the methods described herein and changes may be made in the steps or the sequence of steps of the methods described herein without departing from the spirit and scope of the invention as defined in the following claims.

What is claimed is:

1. A method for spectrum compression, comprising:
producing a digitized spectrum for each of a plurality of known substances with the digitized spectra each having a plurality of absorbance bands on a wavelength axis, each of the digitized spectra comprising a reference digitized spectrum;
separating the absorbance bands of the reference digitized spectrum, thereby creating separated absorbance bands;
locating the separated absorbance bands on the wavelength axis;
curve-fitting the separated absorbance bands to correspond to the absorbance bands of the reference digitized spectrum, creating thereby a plurality of curve-fitted absorbance bands comprising a restored reference spectrum;
identifying an intensity, location and width of each curve-fitted absorbance band comprising the restored reference spectrum; and
storing the intensity, location and width of the curve fitted absorbance bands, thereby creating a stored compressed reference spectrum corresponding to each of the reference digitized spectra.

2. The method of claim 1 further comprising;
obtaining a digitized spectrum of an unknown substance comprising an unknown digitized spectrum; and
identifying the unknown substance using the unknown digitized spectrum and the compressed reference spectra.

3. The method of claim 1 further comprising:
obtaining a digitized spectrum of an unknown substance comprising an unknown digitized spectrum;
retrieving at least a portion of the stored compressed reference spectra;
using the intensity, location and width of the curve-fitted absorbance bands comprising the stored compressed reference spectra to recreate the reference spectra, creating thereby restored reference spectra; and
comparing the restored reference spectra with the unknown digitized spectrum to identify the unknown substance.

* * * * *

UNITED STATES PATENT AND TRADEMARK OFFICE
CERTIFICATE OF CORRECTION

PATENT NO. : 5,311,445
DATED : May 10, 1994
INVENTOR(S) : Robert L. White

It is certified that error appears in the above-identified patent and that said Letters Patent is hereby corrected as shown below:

Column 1, line 61, please delete "container", and substitute therefore --contain--.

Column 3, line 41, please delete "1F", and substitute therefore --1E--.

Column 4, line 4, after the word "Curve-fitting", please insert --1D--.

Column 6, line 55, delete "1 .", and substitute therefore --14--.

Signed and Sealed this

Twentieth Day of September, 1994

*Attest:*

*Attesting Officer*

BRUCE LEHMAN

*Commissioner of Patents and Trademarks*